United States Patent [19]
McManamon et al.

[11] Patent Number: 5,574,553
[45] Date of Patent: Nov. 12, 1996

[54] LADAR RECEIVER INCORPORATING AN OPTICAL AMPLIFIER AND POLARIZATION OPTICAL MIXER

[75] Inventors: Paul F. McManamon, Dayton, Ohio; Gary D. Sharp, Boulder, Colo.; Michael S. Salisbury, Dayton, Ohio; Steven A. Serati, Golden, Colo.

[73] Assignee: The United States of America as represented by the Secretary of the Air Force, Washington, D.C.

[21] Appl. No.: 363,793

[22] Filed: Dec. 27, 1994

[51] Int. Cl.⁶ .............................. G01C 3/08; G01P 3/36; H04B 10/00
[52] U.S. Cl. .................. 356/5.15; 356/28.5; 359/122; 359/156; 359/192
[58] Field of Search .................... 359/122, 156, 359/192; 356/5.15, 28.5

[56] References Cited

U.S. PATENT DOCUMENTS

| 4,240,746 | 12/1980 | Courtenay et al. | 356/5 |
| 4,723,316 | 2/1988 | Glance . | |
| 5,003,625 | 3/1991 | Khoe . | |
| 5,003,626 | 3/1991 | Kuwahara et al. . | |
| 5,052,051 | 9/1991 | Naito et al. . | |
| 5,157,451 | 10/1992 | Taboada et al. | 356/5 |
| 5,162,861 | 11/1992 | Tamburino et al. | 356/5 |

OTHER PUBLICATIONS

M. Salisbury et al, "Sensitivity Improvement of a 1-μm Ladar System Incorporating an Optical Fiber Preamplifier", Optical Engineering, Nov. 1993, vol. 32, No. 11, pp. 2671–2680.

M. Salisbury et al, "Optical-Fiber Preamplifiers for Ladar Detection and Associated Measurements for Improving the Signal-to-Noise Ratio", Optical Engineering, Dec. 1994, vol. 33, No. 12.

G. Sharp, "Optical Processors for Lidar Applications", Final Technical Report for DOD Contract F33615–89–C–1125, Avionics Laboratory, Wright Research and Development Center, Wright–Patterson AFB OH, Jul. 31, 1990.

Primary Examiner—Stephen C. Buczinski
Attorney, Agent, or Firm—Bernard E. Franz; Thomas L. Kundert

[57] ABSTRACT

To greatly increase the sensitivity of a Heterodyne Ladar System, the receiver incorporates an optical preamplifier to amplify the ladar return signal prior to detection. This results in an increase in return signal power on the order of 25 dB. Spontaneous emission noise added by the fiber amplifier counters this gain in a normal scheme. The proposed receiver, however, incorporates a Polarization Optical Mixer to perform balanced mixing, thus rejecting added spontaneous emission beat noise terms and resulting in a large increase in system sensitivity.

5 Claims, 3 Drawing Sheets

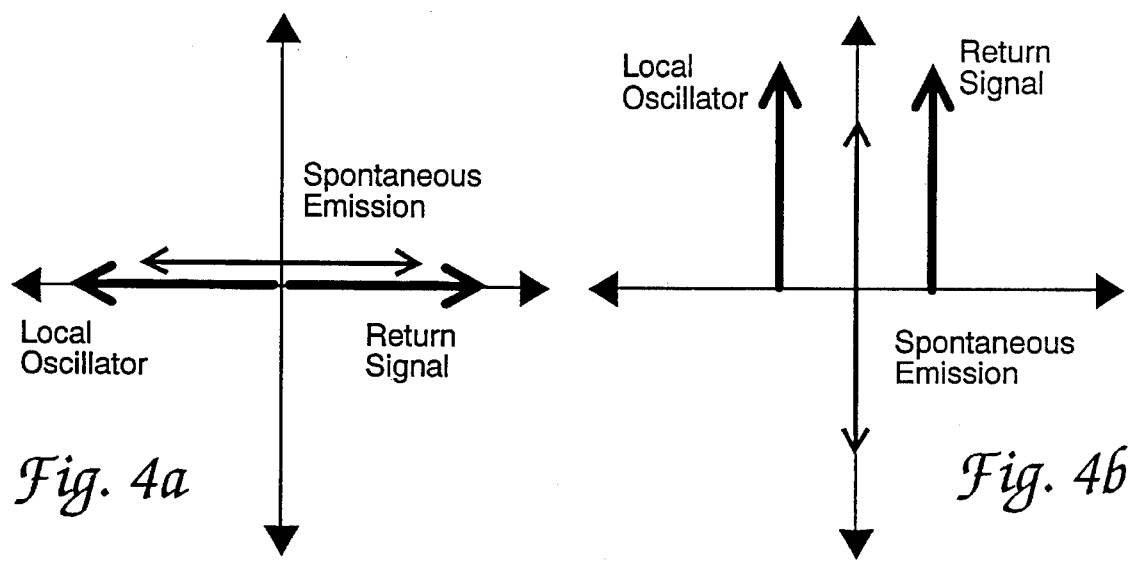
Fig. 4a
Fig. 4b
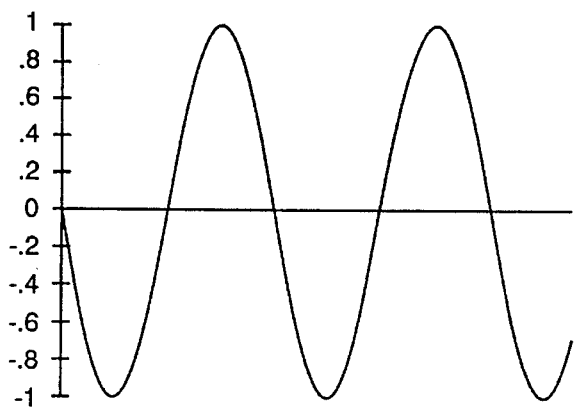
Fig. 5a
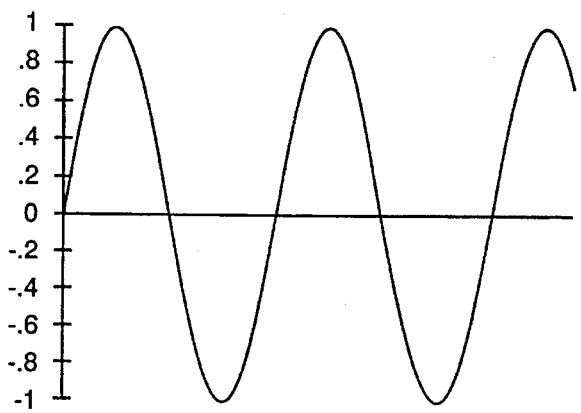
Fig. 5b

LADAR RECEIVER INCORPORATING AN OPTICAL AMPLIFIER AND POLARIZATION OPTICAL MIXER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a heterodyne laser radar (or ladar) receiver incorporating an optical amplifier and polarization optical mixer.

Laser radar systems using the homodyne or heterodyne form of signal detection for improved sensitivity generally utilize a main pulse laser which hits a target and is reflected. The reflected signal is received and is mixed with the laser beam of a frequency shifted local oscillator on a detector.

When the ladar return signal is mixed with the frequency shifted local oscillator (LO), the two signals beat together when incident on an optical detector, creating an intermediate frequency (IF) signal. In the heterodyne mixing process, the local oscillator power is increased until the shot noise dominates the background, detector and electronic noises. This shot noise is inherent in the detection process, and any post detection electronic amplification of the signal amplifies this noise level as well, resulting in no increase in detection sensitivity.

The way to overcome this limitation is to amplify the return signal prior to detection, but an optical amplifier adds noises to the signal. The objective of this invention is to provide a method of rejecting the spontaneous emission noise and allowing the optical amplifiers gain to be realized as a gain in sensitivity.

The following United States patents are of interest.

U.S. Pat. No. 4,240,746—Courtenay et al

U.S. Pat. No. 5,157,451—Taboada et al

U.S. Pat. No. 5,162,861—Tamburino et al

The Courtenay et al patent describes a ladar system which includes a homodyne or heterodyne form of signal detection for improved sensitivity.

The Taboada et al and Tamburino et al patents describe laser imaging and ranging systems which include typical polarization devices.

SUMMARY OF THE INVENTION

An objective of the invention is to provide a heterodyne ladar system with improved detection sensitivity, resulting in increased range performance.

The invention relates to the use of an optical amplifier for preamplification of the ladar return signal and the use of an optical balanced mixing scheme to eliminate the added optical noise. This device will be incorporated into heterodyne ladar systems to improve the detection sensitivity and increase range performance.

Optical preamplification is a common method of increasing ladar return signals, but the added optical noise minimizes the benefit obtained from the gain of the optical amplifier. By combining the optical amplifier with the polarization optical mixer (POM), the spontaneous emission noise added by the amplifier is rejected, allowing the gain from the amplifier to be realized as an increase in sensitivity.

According to the invention, to greatly increase the sensitivity of a heterodyne ladar system, the receiver incorporates an optical preamplifier to amplify the ladar return signal prior to detection. This results in an increase in return signal power on the order of 25 dB. Spontaneous emission noise added by the fiber amplifier counters this gain in a standard scheme. The proposed receiver, however, incorporates a Polarization Optical Mixer to perform balanced mixing, thus rejecting the added spontaneous emission beat noise terms and resulting in a large increase in system sensitivity.

This involves splitting the mixed local oscillator and return signal equally onto two identical detectors. The current from both detectors consists of equal IF signals and amounts of shot noise and added optical noise. By manipulating the polarizations of the return signal and local oscillator, the IF signals from each of the detectors can be adjusted to be 180 degrees out of phase. The currents are then put through a differential amplifier for subtraction. Because the IF currents from each detector are 180 degrees out of phase, the signals are effectively added by the differential amplifier, while the noises are subtracted. This effective noise rejection allows the sensitivity gain of the optical amplifier to be realized.

Before designing a prototype device, the types of ladar systems representing state of the art technology were examined. Currently there is a large effort into developing solid state ladar systems because of their reliability and compactness. A recent development in ladar system receivers involves replacing the difficult free space alignment of the signal and local oscillator beams onto the detector with a fiber optic alignment. An optical amplifier to be integrated into a solid state ladar system needs to be compatible with this fiber optic mixing scheme.

Rare earth doped optical fibers can readily be made into optical amplifiers by pumping the dopant with a laser diode to create a population inversion. A fiber amplifier is perfect for the prototype device application in that it offers a small, lightweight amplifier easily connected into a ladar systems return signal leg.

ADVANTAGES AND NEW FEATURES

This device facilitates the detection of a ladar return signal by increasing the system sensitivity and thereby enhancing the range capabilities of the system. It is the combination of an optical amplifier and a polarization optical mixer which provides maximum sensitivity increase. Sensitivity increases of greater than 20 dB are achievable over a detection scheme without either device.

All of the components are lightweight, compact, and modular, and can be easily integrated into existing state of the art ladar technology. One convenient feature is that the balanced mixing scheme used can be altered to do quadrature mixing to give enhanced target information as well as increased sensitivity.

Another advantage from a normal system results from the fact that some ladar targets depolarize the return signal. In a normal system, the portion of the beam which is depolarized is lost, but in the balanced mixing scheme this depolarized portion simply gets added to the other detector. For the case of complete depolarization, this results in a 3 dB sensitivity increase over the case without this detection configuration.

The prototype example of a fiber amplifier—polarization optical mixer combination is a lightweight and compact device easily added to existing solid state ladar systems, giving enhanced sensitivity on the order of 20 dB and significantly improving the range performance of the system.

BRIEF DESCRIPTION OF THE DRAWING

FIGS. 4a and 4b are graphs which show the polarization orientations after the polarization beamsplitter, with FIG. 4a showing that the fiber containing the x components has local oscillator and return signal powers polarized in opposite directions, and FIG. 4b showing that the fiber containing the y components has local oscillator and return signal powers polarized in the same direction; and FIGS. 5a and 5b are graphs which show the beat current from the two detectors (note that the current from the detector in FIG. 5a is 180 degrees out of phase from the current from the detector in FIG. 5b).

DETAILED DESCRIPTION

Figure 1:
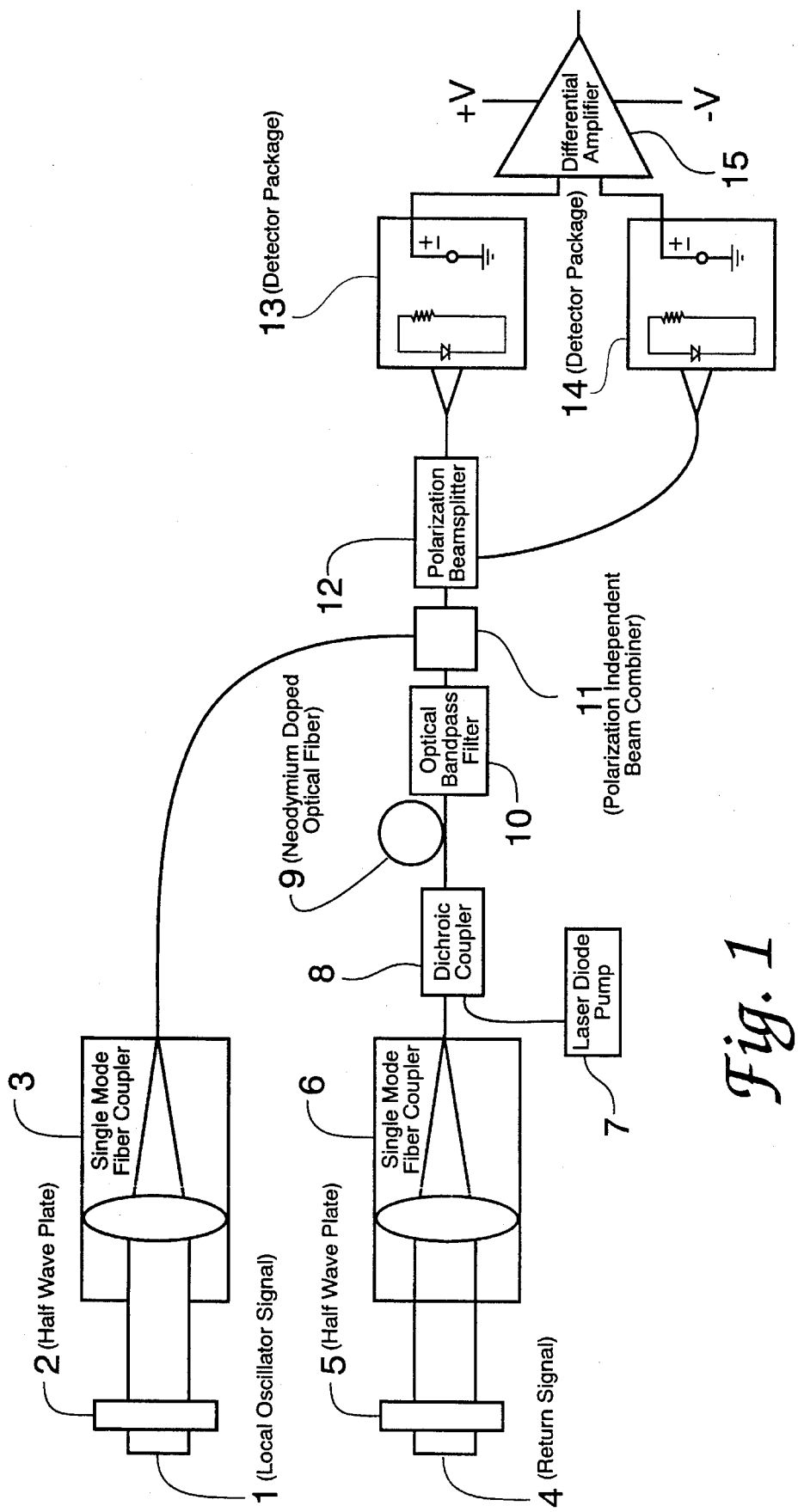
FIG. 1 is a block diagram showing a layout of the proposed device, the combination of an optical fiber amplifier with a polarization optical mixer.

The proposed ladar system has a predetection optical amplifier incorporated into an optical balanced mixing scheme combined with a post detection differential amplifier. The prototype device that has been designed is a solid state ladar system with a rare earth doped fiber amplifier, as shown in FIG. 1, with components as follows:

(1) Local Oscillator Signal—This is the linearly polarized local oscillator power signal that has been frequency shifted from the return signal frequency.

(2) Half Wave Plate—This half wave plate is mounted in a rotatable stage so that the linear polarization of the local oscillator power can be adjusted.

(3) Single Mode Fiber Coupler—This is used to focus the local oscillator power into a single mode fiber.

(4) Return Signal—This is the linearly polarized ladar return signal from the target.

(5) Half Wave Plate—This half wave plate is mounted in a rotatable stage so that the linear polarization of the return signal can be adjusted.

(6) Single Mode Fiber Coupler—This is used to focus the return signal power into a single mode fiber.

(7) Laser Diode Pump—This is the laser diode pump used to create the population inversion in the rare earth dopant.

(8) Dichroic Coupler—This dichroic coupler takes the return signal power from one fiber and the pump power from the other fiber and couples them into a single fiber.

(9) Neodymium Doped Optical Fiber—This a 25 meter spool of optical fiber whose core is doped with the rare earth ion.

(10) Optical Bandpass Filter—This filter is an in-line 4 nanometer filter used to block unabsorbed pump and excess spontaneous emission power.

(11) Polarization Independent Beam Combiner—This combiner couples 10 percent of the local oscillator power and 90 percent of the return signal power into a single fiber without effecting the polarizations of the beams.

(12) Polarization Beamsplitter—This beamsplitter splits the x polarized component of the optical power into one fiber and the y component into another.

(13) Detector Package—This detects the infrared radiation and outputs the intermediate frequency current from the beating between the local oscillator power and the return signal.

(14) Detector Package—This detects the infrared radiation and outputs the intermediate frequency current from the beating between the local oscillator power and the return signal. This IF signal is 180 degrees out of phase with respect to the signal from the other detector 13.

(15) Differential Amplifier—This electronic amplifier takes the difference of the currents from the two detectors 13 and 14.

Figure 2A:
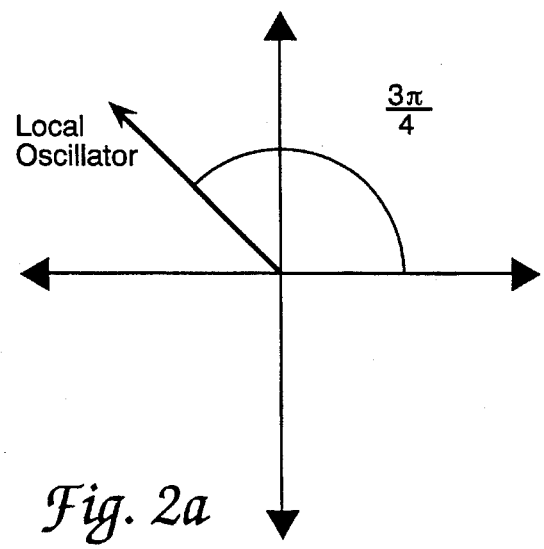
FIGS. 2a and 2b are graphs which show the polarization of optical powers, the orientation of the local oscillator polarization being shown in FIG. 2a, and the orientation of the return signal polarization being shown in FIG. 2b.

Referring to FIG. 1, the linearly polarized local power 1, which is frequency shifted from the ladar center frequency, passes through a half wave plate in a rotatable mount 2. The mount is set so that the linear polarization is rotated to be at $3\pi/4$ radians, as shown in FIG. 2a. The local oscillator signal is then focused into a single mode fiber leading to a polarization independent beam combiner 11, which couples 10 percent of the incoming local oscillator power into the output fiber.

Figure 2B:
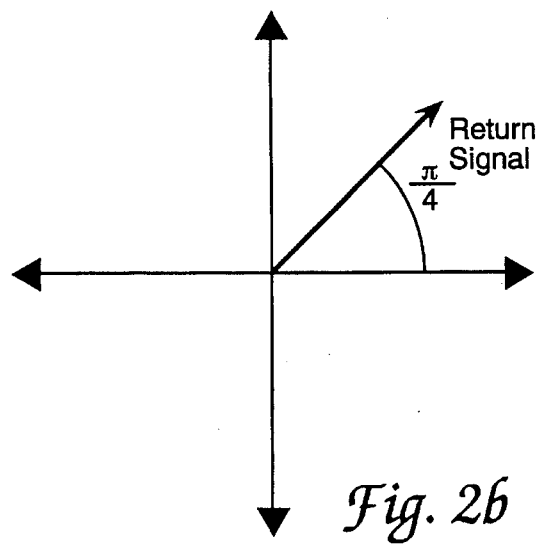

The ladar return signal 4 also passes through a rotatable half wave plate 5, giving a polarization of $\pi/4$ radians, as shown in FIG. 2b. It is then focused into a single mode fiber to a dichroic coupler 8, where the return signal and the pump light from the laser diode 7 are combined into a single fiber. These combined powers are then coupled into the 25 meter spool of doped optical fiber 9, where laser amplification of the return signal occurs and spontaneous emission photons are added. The return signal, now amplified 25 dB, passes through an in-line 4 nanometer optical bandpass filter 10 to block unabsorbed pump and excess spontaneous emission power. The output from the doped fiber is input into the remaining leg of the beam combiner 11, with ninety percent of the power combined with the local oscillator signal in the output fiber.

Figure 3:
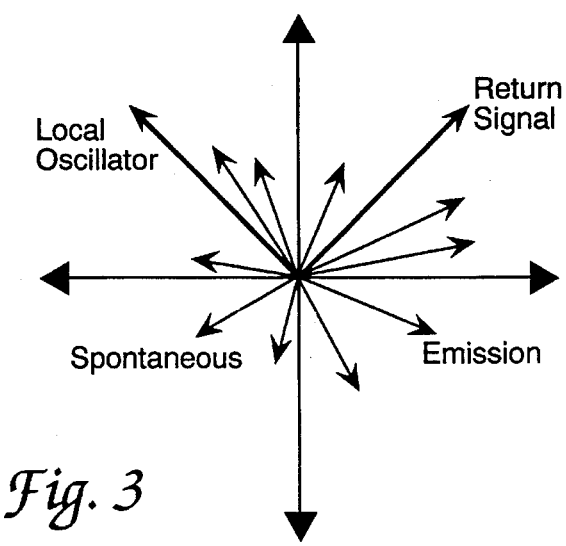
FIG. 3 is a graph which shows the polarizations of the power traveling in the output fiber from the non polarization beam combiner.

The light in the output fiber from the beam combiner consists of local oscillator power, amplified return signal power and randomly polarized spontaneous emission components, as shown in FIG. 3.

A polarization beamsplitter 12 is used to split the x polarization and y polarization components into separate fibers, each pigtailed to detector packages 13 or 14. The polarization of the optical powers in each fiber is shown in FIGS. 4a and 4b.

Note that the x components of the local oscillator signal and return signal (FIG. 4a) are polarized in opposite directions, while the y components (FIG. 4b) are polarized the same direction. When these powers are incident on the detectors, the resulting intermediate frequency currents are 180 degrees out of phase from each other, as shown in FIGS. 5a and 5b.

The currents are fed into a differential amplifier 15, which effectively adds the two signals because of the 180 degree phase difference between them. The random noise currents from each detector, primarily due to local oscillator shot noise and spontaneous emission beat noise, do not have a constant phase relationship between them. The differential amplifier 15 subtracts the noise currents, effectively rejecting some of the noises and decreasing the noise level.

A detailed analysis of the amplification and noise properties of the fiber amplifier portion of the device can be found in the first two publications listed below. A detailed analysis of the local oscillator noise rejection properties of the polarization mixer can be found in the third publication.

1. "Signal to Noise Ratio Improvement of a One Micron Ladar System Incorporating and Optical Fiber Preamplifier." Michael S. Salisbury, Paul F. McManamon and Bradley D. Duncan, Optical Engineering, Nov. 1993.

2. "Optical-fiber preamplifiers for ladar detection and associated measurements for improving the signal to noise ratio." Michael S. Salisbury, Paul F. McManamon and Bradley D. Duncan, Optical Engineering, Dec. 1994.

3. "Optical Processors for Lidar Applications". Phase I SBIR Final Report, Contract No. F33615-89-C-1125, Boulder Nonlinear Systems, Inc., Gary D. Sharp.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A laser radar (ladar) receiver for amplifying and detecting a laser return signal, comprising:

a source of a local oscillator signal which is linearly polarized and frequency shifted from a laser transmitter center frequency;

said source being coupled to a first half wave plate in a first rotatable mount which is set so that the linear polarization is rotated to be at $3\pi/4$ radians;

the local oscillator signal from the first half wave plate being focused into a first single mode fiber leading to a first leg of a polarization independent beam combiner, which couples 10 percent of the incoming local oscillator power into an output fiber;

wherein said laser return signal is coupled to pass through a second rotatable half wave plate, giving a polarization of $\pi/4$ radians;

the laser return signal from the second half wave plate being focused into a second single mode fiber to a dichroic coupler, where the laser return signal and pump light from a laser diode are combined into a third single fiber;

wherein the combined powers from the third single fiber are coupled into a doped optical fiber, where laser amplification of the laser return signal occurs and spontaneous emission photons are added;

output from said doped optical fiber being coupled to pass through an in-line 4 nanometer optical bandpass filter block unabsorbed pump and excess spontaneous emission power;

output from the doped optical fiber via the optical bandpass filter being coupled into a second leg of the beam combiner, with ninety percent of the amplified return signal power being combined with the local oscillator signal power in the output fiber;

wherein light in the output fiber from the beam combiner comprises local oscillator power, amplified return signal power and randomly polarized spontaneous emission components;

the output fiber being coupled to a polarization beamsplitter which is used to split x polarization and y polarization components into two separate fibers, which are coupled respectively to first and second detector packages, the x components of the local oscillator signal and return signal to the first detector package being polarized in opposite directions, while the y components to the second detector package are polarized the same direction, so that when these powers are incident on the detectors, the resulting intermediate frequency currents are 180 degrees out of phase from each other;

output signals from the first and second detector packages being coupled into a differential amplifier, which effectively adds the two signals because of the 180 degree phase difference between them, wherein random noise signals from each detector, primarily due to local oscillator shot noise and spontaneous emission beat noise, do not have a constant phase relationship between them, so that the differential amplifier subtracts the noise currents, effectively rejecting some of the noises and decreasing the noise level.

2. A laser radar receiver according to claim 1, wherein the doped optical fiber is a rare earth doped optical fiber.

3. A laser radar receiver according to claim 1, wherein the doped optical fiber is a 25 meter spool of neodymium doped optical fiber.

4. A laser radar (ladar) receiver for amplifying and detecting a laser return signal, comprising:

a source of a local oscillator signal which is linearly polarized and frequency shifted from a laser transmitter center frequency;

said source being coupled to a first half wave plate in a first rotatable mount which is set so that the linear polarization is rotated to be at $3\pi/4$ radians;

second optical means for selectively polarizing and amplifying the laser return signal including a dichroic coupler, where the laser return signal and pump light from a laser diode are combined and then coupled into a rare earth doped optical fiber, where laser amplification of the laser return signal occurs and spontaneous emission photons are added;

wherein said laser return signal is coupled to pass through a second rotatable half wave plate, giving a polarization of $\pi/4$ radians;

signals from the first and second optical means being coupled to a polarization optical mixer to perform balanced mixing, wherein output from said doped optical fiber is coupled to pass through an optical bandpass filter to block unabsorbed pump and excess spontaneous emission power before being coupled to said polarization optical mixer;

output from the polarization optical mixer being coupled to a polarization beamsplitter which is used to split x polarization and y polarization components into two separate fibers, which are coupled respectively to first and second detector packages, the x components of the local oscillator signal and return signal to the first detector package being polarized in opposite directions, while the y components to the second detector package are polarized the same direction, so that when these powers are incident on the detectors, the resulting intermediate frequency currents are 180 degrees out of phase from each other;

output signals from the first and second detector packages being coupled into a differential amplifier, which effectively adds the two signals because of the 180 degree phase difference between them, effectively rejecting some of the noises and decreasing the noise level.

5. A laser radar receiver according to claim 4, wherein the doped optical fiber is a 25 meter spool of optical fiber whose core is doped with a neodymium rare earth ion.

* * * * *